United States Patent [19]

Wolfe

[11] Patent Number: 4,611,024

[45] Date of Patent: Sep. 9, 1986

[54] PROPYLENE POLYMER COMPOSITION CONTAINING A HYDROTALCITE AND AN ACETAL OF AN ALDITOL

[75] Inventor: Al R. Wolfe, Bartlesville, Okla.

[73] Assignee: Phillips Petroleum Co., Bartlesville, Okla.

[21] Appl. No.: 702,094

[22] Filed: Feb. 14, 1985

[51] Int. Cl.$^4$ .................................................. C08K 5/06
[52] U.S. Cl. ................................. 524/366; 524/108; 524/354; 524/436
[58] Field of Search .............. 524/366, 108, 436, 354

[56] References Cited

U.S. PATENT DOCUMENTS

| | | |
|---|---|---|
| 3,721,682 | 3/1973 | Murai et al. . |
| 4,016,118 | 4/1977 | Hamada et al. .................... 524/108 |
| 4,211,852 | 7/1980 | Matsuda et al. . |
| 4,284,762 | 8/1981 | Takamatsu et al. . |
| 4,299,759 | 11/1981 | Miyata et al. . |
| 4,314,039 | 2/1982 | Kawai et al. ....................... 524/108 |
| 4,371,645 | 2/1983 | Mahaffey, Jr. ..................... 524/108 |
| 4,379,882 | 4/1983 | Miyata . |
| 4,410,649 | 10/1983 | Cieloszyk .......................... 524/108 |
| 4,427,816 | 1/1984 | Aoki et al. . |
| 4,439,567 | 3/1984 | Inoue et al. ........................ 524/108 |
| 4,501,838 | 2/1985 | Hechenbleikner et al. ........ 524/108 |
| 4,532,280 | 7/1985 | Kobayashi et al. ................ 524/108 |

FOREIGN PATENT DOCUMENTS 3322937  1/1985  Fed. Rep. of Germany ...... 524/436

OTHER PUBLICATIONS

Carroll, "A Nucleating Agent for Crystalline Olefinic Polymers", *Modern Plastics*, Sep. 1984, pp. 108–112.

Primary Examiner—Joseph L. Schofer
Assistant Examiner—N. Sarafim
Attorney, Agent, or Firm—A. W. Umphlett

[57] ABSTRACT

A propylene polymer composition containing a clarifier and a small amount of a hydrotalcite to enhance the effect of the clarifier. The resulting composition is of particular value as an injection molding grade resin.

20 Claims, No Drawings

# PROPYLENE POLYMER COMPOSITION CONTAINING A HYDROTALCITE AND AN ACETAL OF AN ALDITOL

BACKGROUND OF THE INVENTION

This invention relates to nucleated propylene polymer compositions.

It is readily apparent that many applications for plastic materials used as films and coatings require substantial clarity. Clarity, however, is also an asset in other applications including injection molding of relative thick parts.

Polypropylene is becoming a major plastic for use in injection molding. Polypropylene, however, tends to be opaque in the absence of a clarifying or nucleating agent. Apparently nucleating agents work by bringing about the formation of a large number of small crystals instead of the formation of large spherulite crystals. Nucleation of polypropylene is not a simple matter, however. Solid nucleating agents such as sodium benzoate which apparently work by forming small discrete particles around which crystals form, tend to be limited in the concentration to which they can be used without being counter-productive. In addition, polypropylene must be stabilized and some combinations of stabilizers, nucleating agents and catalyst residue can actually cause degradation or at least reduce the clarifying effectiveness of the nucleating agent.

One particularly desirable class of clarifying agents known in the art is that represented by alditols and substituted alditols such as dibenzylidene sorbitol, which is sold by Milliken Chemicals under the tradename Millad 3905. These materials can be melted at polymer processing temperatures and can be more uniformly distributed than solid discrete particles and thus can be used in sufficiently high concentration to provide a more effective clarifying or nucleating effect. However, the presence of catalyst residues has an adverse interaction with such materials thus limiting their usefulness as a practical matter.

SUMMARY OF THE INVENTION

It is an object of this invention to provide a clear propylene polymer composition;

It is a further object of this invention to provide a degradation resistant propylene polymer composition; and It is yet a further object of this invention to provide an improved injection molding grade propylene polymer resin.

In accordance with this invention, a propylene polymer composition is provided having an additive system comprising (1) an acetal formed by reacting a 5-7 carbon atom alditol with a 2-8 carbon atom aldehyde, and (2) a hydrotalcite.

DESCRIPTION OF THE PREFERRED EMBODIMENTS

The propylene polymers to which this invention applies can be either homopolymers of propylene or copolymers of propylene and 0.1 to 20 weight percent ethylene incorporation. Other monomers in very minor amounts not significantly affecting the properties of the composition can also be present. Generally, the copolymers will contain 1 to 4 weight percent ethylene incorporation. Suitable polymers have a melt flow of 1-40 g/10 minutes (ASTM D-1238 Condition L).

The clarifying agent can be any reaction product of a 5-7 carbon atom alditol and a 2-8 carbon atom aldehyde.

The preferred alditol is a hexitol, most preferably sorbitol. The aldehyde can be either a saturated aliphatic aldehyde or an aromatic aldehyde, benzaldehyde being especially preferred. Examples of other suitable aldehydes include o, m, or p-toluylaldehydes, acetaldehyde, propionaldehyde, and n-actaldehyde. The resulting polyol acetal can be either a mono, di or triacetal but is preferably a diacetal. The production of the preferred material, dibenzylidene sorbitol is disclosed in Murai et al U.S. Pat. No. 3,721,682 (Mar. 20, 1973), the disclosure of which is hereby incorporated by reference.

The clarifying agent is used in an amount generally within the range of 0.1 to 0.5 weight percent based on the weight of propylene polymer, preferably in an amount in the range of about 0.2 to 0.3 weight percent.

The hydrotalcite can be any magnesium-aluminum hydroxide compound of the type generically referred as hydrotalcites. Generally, these materials are hydrated and contain a mixture of aluminum hydroxide and a magnesium salt such as magnesium carbonate and/or magnesium sulfate or phosphate. One suitable material is sold under the designation DHT-4A by Mitsui and Co. having the approximate formula $Mg_{4.5}Al_2(OH)_{13}CO_3 \cdot 3\frac{1}{2}H_2O$. Any of the hydrotalcites broadly disclosed in Miyata et al U.S. Pat. No. 4,299,759 (Nov. 10, 1981), the disclosure which is hereby incorporated by reference, are suitable for use in this invention. Another specific example is $MgCO_3 \cdot 5Mg(OH)_2 \cdot 2Al(OH)_3 \cdot 4H_2O$. Hydrotalcites are known in the art for use as fillers in olefin polymer compositions. In accordance with this invention, however, the hydrotalcite is used in a very small amount, specifically in the range of 0.01 to 0.5 weight percent, preferably about 0.02 to 0.15 weight percent based on the weight of the polymer.

The compositions of this invention can also contain conventional antioxidants commensurate with the type of utility contemplated, ultraviolet light stabilizers for compositions to be used in outdoor applications and lubricants to facilitate fabrication as well as other conventional additives for specialized usages such as flame retardants, slip agents, pigments, and the like. Generally, the compositions will contain a stabilizer system containing at least a hindered phenol and a phosphite. The amount of stabilizer package should be that amount effective to provide the desired degree of protection in the selected end use. Generally, an amount within the range of 0.1 to 1 weight percent, preferably 0.2 to 0.5 weight percent in addition to the hydrotalcite and clarifying agent is satisfactory.

Suitable hindered phenols include tris(3,5-di-t-butyl-4-hydroxybenzyl)isocyanurate sold under the trademark Goodrite 3125, tetrakis[methylene(3,5-di-t-butyl-4-hydroxy-hydrocinnamate)]methane sold under the trademark of Irgonox 1010 and 2,6-di-t-butyl-4-methylphenol (BHT). Suitable phosphites include bis(2,4-di-t-butylphenyl)pentaerythritol diphosphite sold under the tradename Ultranox 626, tris(nonylphenyl)phosphite and triphenylphosphite.

Suitable phenol antioxidants and organic phosphites are disclosed in Mills U.S. Pat. No. 3,642,690 (Feb. 15, 1972) the disclosure of which is hereby incorporated by reference. Additional suitable phosphites are disclosed in Gilles U.S. Pat. No. 4,025,486 (May 24, 1977) the disclosure of which is hereby incorporated by reference.

A metal soap such as calcium stearate is generally present as a lubricant and/or stabilizer in an amount within the range of 0.025 to 1, preferably 0.05 to 0.5 weight percent based on the weight of the polymer.

Another conventional additive frequently present is an antistatic agent, for instance, a low glycerine glycol monostearate such as Aldo MSLG-K. The antistatic agent will generally be present in an amount within the range of 0.025 to 1, preferably 0.05 to 0.5 weight percent based on the weight of the polymer.

Other known stabilizer components such as hindered amines in an amount within the range of 0.025 to 1, preferably 0.025 to 0.5 weight percent based on the weight of the polymer can be present.

Suitable hindered amines include bis(1,2,2,6,6-pentamethyl-4-piperidyl)sebacate, sold under the trademark Tinuvin 765, bis(2,2,6,6-tetramethyl-4-piperidyl)-sebacate sold under the trademark Tinuvin 770 and poly(2,2,6,6-tetramethyl-4-piperidyl-aminotriazine sold under the trademark Chimassorb 944, all by Ciba-Geigy.

The ingredients can be incorporated into the polymer in any manner known in the art including solution blending and dry blending but will generally be incorporated by melt blending as a part of the finishing operation in the production of the polymer. At least the antioxidant is preferably incorporated at this stage or earlier. It is also possible to melt blend the clarifier and hydrotalcite into standard stabilized propylene polymer formulations by melt blending utilizing a Banbury mixer or other intensive mixer or a mixing extruder.

The polymer compositions of this invention can be used in any utility including film and fiber, but are of particular benefit for use in injection molded items such as housewares, food containers, hospital and other medical supplies, and other utilities where outstanding clarity, good impact strength, and excellent natural color are desired.

Exemplary molding conditions include a stock temperature of 375° to 450° F. (91° to 232° C.) and a cold mold, 60° to 100° F. (16° to 38° C.) with maximum injection pressure and rate.

EXAMPLE I

A random propylene copolymer having 1.7 weight percent ethylene incorporation and a melt flow of 2 g/10 min. was combined in a Henchel mixer with the additive packages set out herein below in Table I, the listed concentrations being in weight percent and based on the weight of the polymer. The resulting blend was then passed to an extruder where the composition was rendered molten, mixed, and extruded to form pellets.

The resulting pellets were then injection molded into test specimens of varying thickness and the clarity determined. The results set out in Table IA show that the addition of the hydrotalcite greatly enhances the clarity.

TABLE I

|  | Control | Invention |
|---|---|---|
| hydrotalcite[a] | 0 | 0.05 |
| clarifier[b] | 0.25 | 0.25 |
| antioxidant[c] | 0.10 | 0.10 |
| lubricant[d] | 0.10 | 0.10 |
| phosphite[e] | 0.10 | 0.10 |

[a]DHT-4A, $Mg_{4.5}Al_2(OH)_{13}CO.3\frac{1}{2} H_2O$.
[b]Millad 3905, dibenzylidene sorbitol from Milliken Chemicals. The formula for dibenzylidene sorbitol is:

$$\phi\text{-CH(O-)O-CH}\cdots\text{CH-O-O-CH-}\phi\text{, CH}_2\text{-CH-CH-CH-CH(OH)-CH(OH)-CH}_2$$

[c]Irganox 1010.
[d]calcium stearate.
[e]Ultranox 626, bis(2,4-di-t-butylphenyl)pentaerythritol diphosphite.

TABLE IA

| | Haze % | |
|---|---|---|
| Thickness, mils | Control | Invention |
| 33 | 16 | 12 |
| 53 | 36 | 23 |
| 70 | 44 | 29 |

EXAMPLE II

The same polymer of Example I was compounded in the same manner with the additive package set out herein below in Table II. The resulting pellets were then injection molded into test specimens as in Example I with the results shown in Table IIA. These results also show a dramatic improvement in haze through the use of a hydrotalcite. The control and the invention runs in this Example were not exactly comparable, in that the control did not have the lubricant but it is apparent from Example I that it is the hydrotalcite which brings about the dramatic improvement in haze.

TABLE II

|  | Control | Invention |
|---|---|---|
| hydrotalcite[a] | 0 | 0.05 |
| clarifier[b] | 0.25 | 0.25 |
| antioxidant[c] | 0.13 | 0.13 |
| lubricant[d] | 0 | 0.09 |
| phosphite[e] | 0.05 | 0.05 |
| antistatic agent[f] | 0.09 | 0.09 |

[a]DHT-4A, $Mg_{4.5}Al_2(OH)_{13}CO.3\frac{1}{2} H_2O$.
[b]Millad 3905, dibenzylidene sorbitol.
[c]BHT
[d]calcium stearate.
[e]Ultranox 626, bis(2,4-di-t-butylphenyl)pentaerythritol diphosphite.
[f]Aldo MSLG-K low glycerine glycol monostearate.

TABLE IIA

| | Haze % | |
|---|---|---|
| Thickness, mils | Control | Invention |
| 33 | 31 | 13 |
| 53 | 50 | 18 |
| 70 | 58 | 26 |

While this invention has been described in detail for the purpose of illustration, it is not to be construed as limited thereby but is intended to cover all changes and modifications within the spirit and scope thereof.

I claim:

1. A composition comprising:
   (a) a predominantly propylene polymer;
   (b) a clarifying agent comprising an acetal of a 5-7 carbon atom alditol and a 2-8 carbon aldehyde; and
   (c) 0.01 to 0.5 weight percent based on the weight of said polymer of a hydrotalcite.

2. A composition according to claim 1 wherein said polymer is propylene homopolymer.

3. A composition according to claim 1 wherein said polymer is a copolymer of propylene with 0.1 to 20 weight percent ethylene incorporation.

4. A composition according to claim 3 wherein said polymer is a copolymer of propylene with 1 to 4 weight percent ethylene incorporation.

5. A composition according to claim 1 containing in addition a phenolic antioxidant, an organic phosphite, a lubricant, and an antistatic agent.

6. A composition according to claim 5 wherein said phenolic antioxidant is selected from tetrakis[methylene(3,5-di-t-butyl-4-hydroxyhydrocinnamate)]methane and BHT, said organic phosphite is bis(2,4-di-t-butylphenyl)pentaerythritol diphosphite, said lubricant is calcium stearate, and said antistatic agent is a low glycerine glycol monostearate.

7. A composition according to claim 5 wherein said hydrotalcite has the formula $Mg_{4.55}Al_2(OH)_{13}CO_3 \cdot 3\frac{1}{2} H_2O$.

8. A composition according to claim 5 wherein said acetal is dibenzylidene sorbitol.

9. A composition according to claim 8 wherein said hydrotalcite has the formula $Mg_{4.5}Al_2(OH)_{13}CO_3 \cdot 3\frac{1}{2} H_2O$, and is present in an amount within the range of 0.05 to 0.15 weight percent based on the weight of said polymer.

10. A composition according to claim 1 wherein said hydrotalcite has the formula $Mg_{4.5}Al_2(OH)_{13}CO_3 \cdot 3\frac{1}{2} H_2O$.

11. A composition according to claim 1 wherein said alditol is a 6 carbon atom alditol.

12. A composition according to claim 1 wherein said aldehyde is an aromatic aldehyde.

13. A composition according to claim 12 wherein said aldehyde is benzaldehyde.

14. A composition according to claim 13 wherein said alditol is a 6 carbon atom alditol.

15. A composition according to claim 14 wherein said acetal is a diacetal.

16. A composition according to claim 1 wherein said acetal is a diacetal.

17. A composition according to claim 1 wherein said acetal is dibenzylidene sorbitol.

18. A composition according to claim 1 wherein said polymer has a melt flow within the range of 1 to 40 g/10 minutes.

19. A composition according to claim 1 wherein said hydrotalcite is present in an amount within the range of 0.02 to 0.15.

20. A composition according to claim 19 wherein said clarifier is present in an amount within the range of 0.1 to 0.5.

* * * * *